United States Patent [19]

Allen et al.

[11] Patent Number: 5,363,302

[45] Date of Patent: Nov. 8, 1994

[54] POWER RATE SYSTEM AND METHOD FOR ACTUATING VEHICLE SAFETY DEVICE

[75] Inventors: Jace L. Allen, Farmington Hills; Tony Gioutsos, Brighton, both of Mich.

[73] Assignee: Automotive Systems Laboratory, Inc., Farmington Hills, Mich.

[21] Appl. No.: 709,891

[22] Filed: Jun. 4, 1991

[51] Int. Cl.$^5$ .............................................. B60R 21/32
[52] U.S. Cl. ................... 364/424.05; 280/735; 180/282; 340/436
[58] Field of Search .................. 364/424.05; 280/735; 180/274, 282; 340/436

[56] References Cited

U.S. PATENT DOCUMENTS

| | | | |
|---|---|---|---|
| 3,911,391 | 10/1975 | Held et al. | 280/735 |
| 4,020,453 | 4/1977 | Spies et al. | 280/735 |
| 4,381,829 | 5/1983 | Montaron | 364/424.04 |
| 4,984,651 | 1/1991 | Grösch et al. | 180/268 |
| 4,985,835 | 1/1991 | Sterler et al. | 364/424.04 |
| 5,038,134 | 8/1991 | Kondo et al. | 340/438 |
| 5,067,745 | 11/1991 | Yoshikawa | 280/735 |
| 5,068,793 | 11/1991 | Condne et al. | 364/424.05 |
| 5,073,860 | 12/1991 | Blackburn et al. | 364/424.05 |
| 5,081,587 | 1/1992 | Okano | 364/424.05 |
| 5,083,276 | 1/1992 | Okano et al. | 364/424.05 |
| 5,157,268 | 10/1992 | Spies et al. | 307/10.1 |

Primary Examiner—Vincent N. Trans
Attorney, Agent, or Firm—Lyon & Delevie

[57] ABSTRACT

A system and method for determining when a vehicle safety device should be actuated includes a sensor whose analog output is filtered and then sampled to provide acceleration data. The acceleration data is integrated to obtain a value representative of vehicle velocity V. Consecutive values of the sampled data are also stored in a RAM and thereafter totaled or averaged to provide at least two acceleration values for calculating vehicle jerk and the square of vehicle acceleration. One of the acceleration values is added to the negative value of another of the acceleration values to obtain an approximation of the slope, or jerk J, of the data; and one of the acceleration values is squared to provide a squared acceleration value $A^2$. The jerk J is then multiplied by the velocity V to obtain the velocity-jerk product, V*J, which is subsequently added to the squared acceleration value $A^2$ to obtain a value proportional to the rate of change of power for the sensor's seismic mass. The rate of change of power value is then compared with a threshold value therefor, and the vehicle safety device is actuated when the rate of change of power value exceeds this threshold.

16 Claims, 3 Drawing Sheets

POWER RATE SYSTEM AND METHOD FOR ACTUATING VEHICLE SAFETY DEVICE

BACKGROUND OF THE INVENTION

The instant invention relates to actuation of vehicular safety devices and, more particularly, to a power rate process using the rate of power change in vehicle acceleration (deceleration) to determine crash severity and, hence, whether a vehicle safety device should be actuated or deployed.

A variety of systems for actuating vehicular safety devices are well known in the art. Such systems are used to sense a crash condition and, in response to such a condition, to actuate an air bag, or lock a seat belt, or actuate a pretensioner for a seat belt retractor. Typically, the safety device is actuated or deployed into its protective position when an impact exceeding a predetermined magnitude is detected by the actuating system.

One prior art method of crash detection integrates the output of an electronic acceleration sensor over time and compares the result against a threshold velocity. One problem with the integration method of crash detection is that the crash severity cannot be determined early enough for high-speed angular, partial barrier, or pole crashes. Moreover, the wide "grey area" between "fire" and "no-fire" conditions for low-speed crash conditions often results in an inadvertent deployment of the safety device when deployment is unnecessary, or a non-deployment of the safety device when deployment is necessary.

A second known method of crash detection using an electronic acceleration sensor attempts to deemphasize the use of simple velocity calculations and instead measures the energy dissipated during a crash to assess crash severity. However, this "energy method" still utilizes velocity information, resulting in the same types of deployment problems and slow response time as are encountered with the integration method. Additionally, the energy method has a further limitation of detection capability in that it is accurate only over short time intervals.

In an effort to provide improved crash detection capability, U.S. Pat. No. 3,762,495 to Usui et al discloses crash evaluation circuitry which concurrently employs both a jerk algorithm, indicative of rate of change of vehicle deceleration, and a deceleration algorithm, indicative of the level of vehicle deceleration. However, experience has shown that jerk alone is incapable of properly discriminating between conditions requiring actuation of a vehicle safety device and conditions where such actuation is either unnecessary or undesirable. And, since the Usui system requires simultaneous "fire" signals from its two evaluation circuits before the safety device is actuated, the Usui system continues to poorly discriminate between "fire" and "no fire" conditions.

SUMMARY OF THE INVENTION

It is an object of the instant invention to provide a system and method for crash detection which can reliably and instantaneously detect crash severity earlier than an integration or energy algorithm, and over a wider variety of circumstances and a wider time interval than is currently possible.

A further object of the instant invention is to provide such a crash severity determination, using jerk, which reliably activates a vehicle safety device in situations where injury to the vehicle and vehicle operator are likely to result from the crash.

Yet another object of the instant invention is to provide a system and method for crash severity determination which is available for use whether the sensor is positioned on the vehicle dash or on the vehicle floor, and which is readily adaptable to a variety of vehicles.

Under the instant invention, a power rate method of crash detection is employed using the rate of change of power in the seismic mass of an accelerometer located in the vehicle for purposes of crash severity detection. The instant power rate method is a prediction-based method which overcomes the limitations of the prior art systems. Filtering, averaging, and smoothing techniques are used to avoid inadvertent deployment from road noise and/or electromagnetic interference ("EMI"). The rate of change of power experienced by the sensor's seismic mass correlates well with the need for actuation of vehicle safety devices, since its rate of change of power is proportional to that experienced by a vehicle passenger positioned near the sensor. Finally, the instant power rate method prevents inadvertent actuation of the safety device in many low-speed crash situations due to the exponential difference between velocity and power change, and otherwise reduces the "grey area" with respect to such low-speed crash situations.

The instant system for actuating a vehicle safety device in the event of a vehicle crash or sudden vehicle deceleration comprises means for generating sampled data representative of the instantaneous acceleration of the vehicle; means for integrating the acceleration data to obtain a vehicle velocity value; a RAM for storing consecutive values of the acceleration data; means for generating at least two acceleration values based on the consecutive values of the acceleration data stored in RAM, with the acceleration values each being either a total or an average of some of the stored acceleration data; means for calculating a jerk value based on two of the acceleration values; and means for multiplying the vehicle velocity value with the jerk value to obtain a velocity-jerk product.

Inasmuch as the velocity-jerk product is the dominant term in calculating the rate of change of power value for crash conditions requiring earlier actuation of vehicle safety devices, the instant system may further comprise means responsive to the velocity-jerk product for actuating the safety device when with a threshold value therefor. However, in the preferred embodiment, a more complete calculation of the instantaneous rate of change of power is obtained so as to accommodate a wider range of crash conditions and, hence, the preferred system instead further comprises means for obtaining the square of one of the acceleration values; means for adding the velocity-jerk product to the squared acceleration value to obtain a rate of change of power value; and means responsive to the rate of change of power value for actuating the safety device when the rate of change of power value exceeds a threshold value therefor. The threshold against which either the velocity-jerk product or the rate of change of power value is compared preferably varies over time, e.g., to provide superior protection against accidental actuation of the safety device due to road noise, and to provide a relatively lower, intermediate threshold for use in detecting crashes of relatively shorter duration.

The instant method for determining when a vehicle safety device should be actuated comprises the steps of sampling data representative of instantaneous vehicle acceleration; integrating the acceleration data to obtain a vehicle velocity value; storing consecutive values of acceleration data in a buffer, such as a RAM; generating at least two acceleration values based on the stored acceleration data; calculating a jerk value based on two of the acceleration values; and multiplying the vehicle velocity value with the jerk value to obtain a velocity-jerk product.

As noted hereinabove, the dominance of the velocity-jerk product in calculating the rate of change of power for crash conditions requiring earlier actuation of vehicle safety devices permits the use of the instantaneous velocity-jerk product as an approximation for the instantaneous rate of change of power. Thus, the instant method may further comprise the step of comparing the velocity-jerk product with a threshold value therefor. Preferably, however, the method instead further comprises the steps of obtaining the square of one of the acceleration values; adding the velocity-jerk product to the squared acceleration value to obtain a rate of change of power value; and comparing the rate of change of power value with a threshold value therefor, with the safety device being actuated when the rate of change of power value exceeds the threshold value. The inclusion of the squared acceleration value provides for quicker overall actuation of the safety device in the event that the velocity-jerk product itself fails to exceed the rate-of-change-of-power threshold. Either of the above methods may further comprise the step of varying its respective threshold over time, whereby even quicker safety device response to high-speed crashes may be obtained.

From the foregoing, it will be appreciated that the instant system provides a prediction of crash severity based on rate of power change, rather than looking at the current state of energy, as in the prior art.

DETAILED DESCRIPTION OF THE PREFERRED EMBODIMENT OF THE INVENTION

Figure 1:
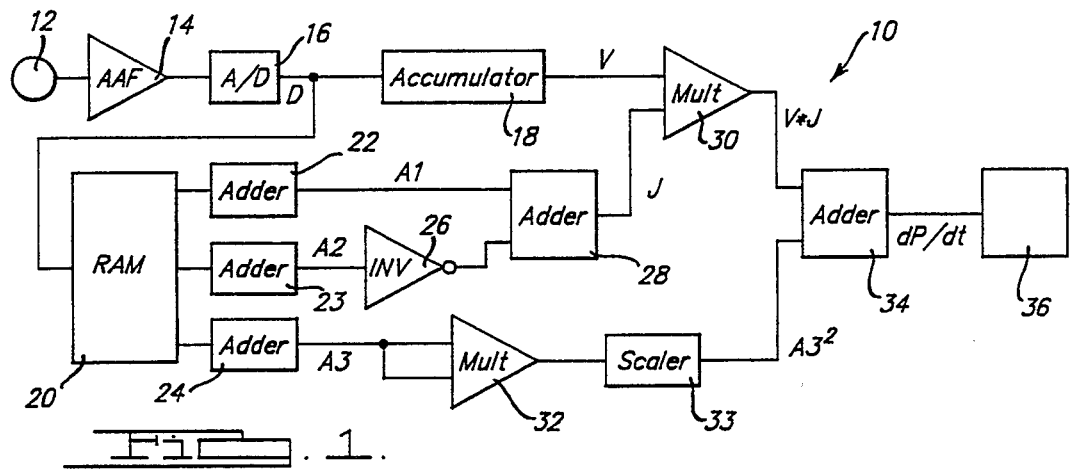
FIG. 1 is a block diagram of a system for actuating a vehicle safety device in accordance with the instant invention.

Referring to the drawings, FIG. 1 is a block diagram of a system 10 for actuating a safety device, such as an air bag (not shown), on a motor vehicle (also not shown). An electronic crash sensor 12 provides an analog output representative of instantaneous acceleration (deceleration) of a seismic mass suspended within a vehicle. The sensor's analog output is passed through an anti-aliasing filter ("AAF") 14 having a nominal cut-off frequency of 200 Hz and is thereafter sampled by an analog-to-digital converter 16. The sampled acceleration data D is thereafter integrated using an accumulator 18 to obtain vehicle velocity V. Consecutive values of the sampled acceleration data are also stored in a RAM 20 using a 16-sample first-in-first-out (FIFO) buffer, with stored data being labeled as $D_0$ through $D_{15}$, where $D_0$ is the most recent data. Three acceleration values A1, A2, and A3 are generated at first adder 22, second adder 23, and third adder 24, respectively, according to the following:

$$A1 = \sum_{K=0}^{H-1} D_K$$

$$A2 = \sum_{H}^{N} D_K$$

and $$A3 = \sum_{x}^{y} D_K$$

where N is equivalent to the buffer length at RAM 20; H is equivalent to one-half the buffer length; and $D_x$ and $D_y$ delimit the range within the buffer to be used in calculating a squared acceleration term. In this regard, it is noted that A3 may or may not be equal to either A1 or A2, depending upon the values chosen for x and y.

Once generated, the second acceleration value A2 has its sign changed at inverter 26 before being added to the first acceleration value A1 at third adder 28, thereby obtaining a value for the slope, or jerk J, of the acceleration data D. Thus, $$J = A1 - A2$$

The value for the jerk J thus obtained at third adder 28 is then multiplied, at first multiplier 30, by the velocity V value provided by accumulator 18, resulting in the velocity-jerk product, V*J.

Additionally, the acceleration value A3 generated by the third adder 24 is squared at second multiplier 32. Assuming that the acceleration value A3 is generated in this instance by totalling eight consecutive values of acceleration data D, the acceleration value A3 is eight times larger than the average acceleration, and the output of the second multiplier 32 is 64-times larger than the average acceleration. Since the value for the jerk J equals the difference between the first and second acceleration values A1 and A2, each of which are likewise generated in this instance by totalling eight consecutive values of acceleration data D (a number equal to half the buffer length), the resulting value for the jerk J is eight times the jerk J based on average acceleration. Thus, in order to avoid undue weighting of the squared acceleration term in calculating a value for the rate of change of power, the output of multiplier 32 is passed through a scaler 33 which, in this instance, divides the output of multiplier 32 by eight, thereby normalizing the values for jerk J and squared acceleration $A3^2$, respectively.

The V*J product from first the multiplier 30 is added, at fourth adder 34, to the squared acceleration value $A3^2$ as scaled by scaler 33 to obtain a value for the rate of change of power, dP/dt. The value for the rate of change of power, dP/dt, is thereafter fed to means 36 responsive to the rate of change of power for actuating the safety device when the value for the rate of change of power exceeds a threshold value T therefor. In this regard, it will be noted that the instant invention contemplates the use of a time-varying threshold T(t) with which to compare the rate of power change value, dP/dt. The time-varying threshold T(t) is preferably based upon such parameters as the position of the sensor 12 within the vehicle, e.g., whether it is mounted in the passenger compartment on the dashboard or on the floor, or within the vehicle's engine compartment; and the structural characteristics of the vehicle. In this manner, the instant system may be tailored to each vehicle to provide vehicle passengers maximum protection against injury.

Figure 4:
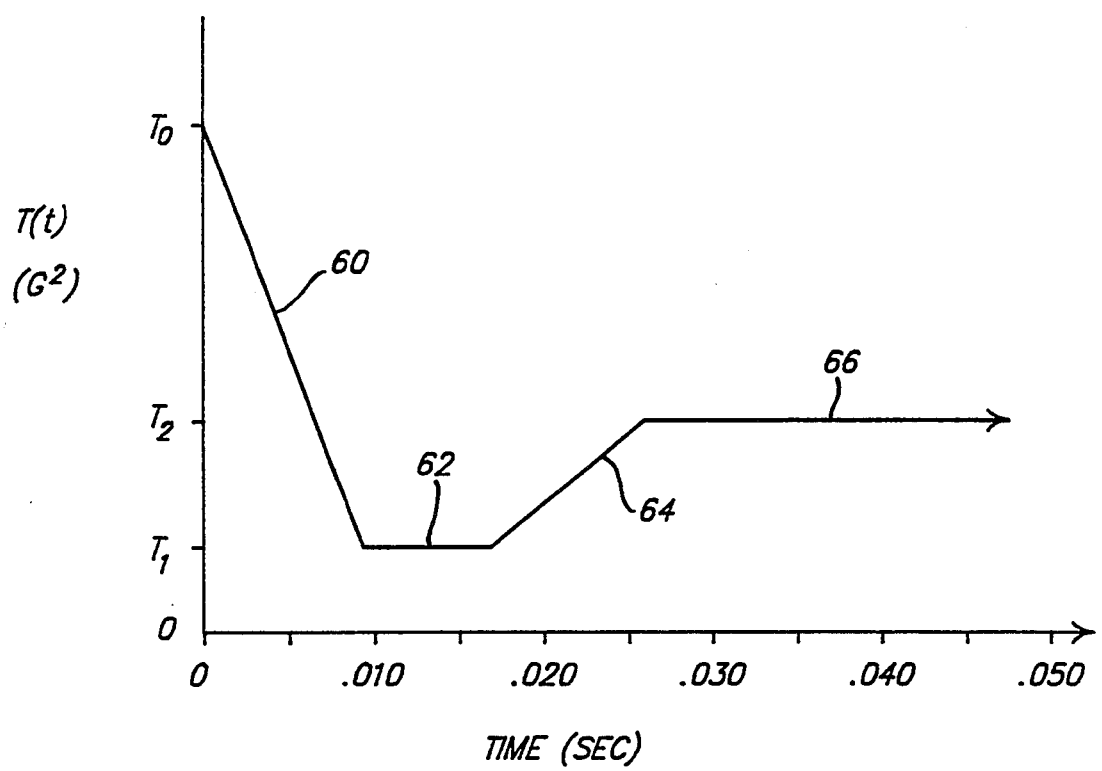
FIG. 4 is an illustration of a time-varying threshold for use with the instant invention.

An example of a time-varying threshold T(t) for use with the instant invention is illustrated in FIG. 4, where $t_0$ is the crash entry-point, as determined from values for average acceleration and average jerk. The time-varying threshold illustrated in FIG. 4 comprises a high initial threshold $T_0$ at the crash entry-point $t_0$; a first portion 60 which ramps down over a period of perhaps about 9 msec from the initial threshold $T_0$ to a relatively-lower, intermediate threshold $T_1$; a second portion 62 where the intermediate threshold $T_1$ is maintained for perhaps about 8 msec for detecting relatively high-speed crash conditions; a third portion 64 which ramps up from the intermediate threshold $T_1$ to a relatively-higher final threshold $T_2$ over a period of perhaps about 9 msec; and a fourth portion 66 where the final threshold $T_2$ is thereafter indefinitely maintained until average values for acceleration and jerk indicate that the threshold T is to be reset, i.e., the time t is to be reset to $t_0$.

Specifically, the first portion 60 of the time-varying threshold T(t) illustrated in FIG. 4 serves to retard actuation of the safety device, e.g., to prevent actuation of the safety device due to a high jerk value from rough road. The second portion 62 of time-varying threshold T(t) is used for detecting high-speed crash conditions, i.e., where the velocity-jerk product is likely to dominate the value for instantaneous rate of change of power, thereby providing a significant reduction in time-to-fire over the prior art. The third and fourth portions 64 and 66 of time-varying threshold T(t) act in conjunction with the squared acceleration value $A3^2$ to provide a reduced time-to-fire and, hence, superior passenger protection in such situations as angular crashes, partial barrier crashes, and pole crashes, where the resulting velocity-jerk product may not exceed the relatively-lower intermediate threshold $T_1$: if a high-speed crash were to "miss" the intermediate threshold $T_1$, the squared acceleration value $A3^2$ will cause the rate of change of power value to ultimately exceed either the third or fourth portions 64 and 66 of the time-varying threshold T(t) more quickly than with prior art systems.

Figure 2:
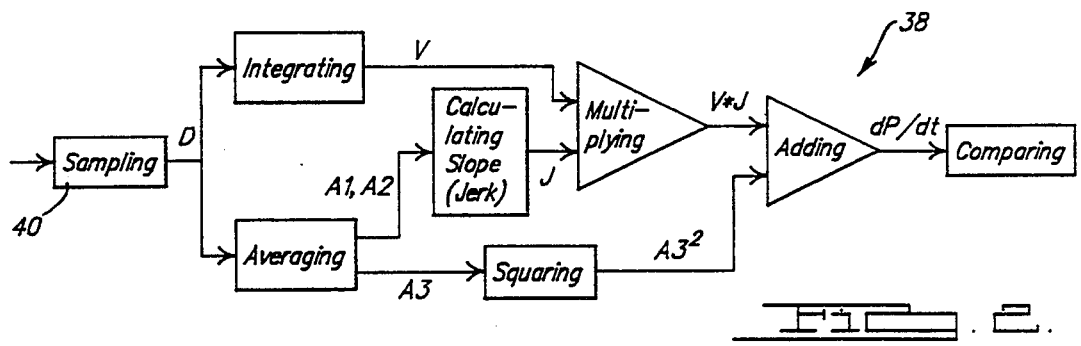
FIG. 2 is a flow chart of the method of the instant invention.

FIG. 2 is a generalized flow chart 38 for the instant method for determining when a vehicle safety device should be actuated. The analog output 40 of an acceleration sensor is sampled to obtain acceleration data D, consecutive values of which are stored and averaged to obtain acceleration values A1 and A2, as follows:

$$A1 = \sum_{K=0}^{H-1} D_K$$

$$A2 = \sum_{H}^{N} D_K$$

and $$A3 = \sum_{x}^{y} D_K$$

where N is equivalent to the number of consecutive acceleration data values retained for averaging; H is equal to N/2; and $D_x$ and $D_y$ delimit the range of consecutive acceleration data values to be used in calculating a squared acceleration term. In this regard, it is noted that A3 may or may not be equal to either A1 or A2, depending upon the values chosen for x and y. The sampled acceleration data D is also integrated to obtain a value representative of vehicle velocity V.

The slope, or jerk J, is theoretically calculated according to the following equation:

$$j(t) = \frac{da}{dt}$$

where a is acceleration of the vehicle. Due to sampling, the instant method approximates the jerk J by calculating the difference between the first and second acceleration values A1 and A2 using the following formula:

$$J \approx A1 - A2$$

The jerk J thus obtained is thereafter multiplied by the velocity V to obtain the velocity-jerk product, V*J. Meanwhile, the third acceleration value A3 is squared to obtain a squared acceleration value $A3^2$.

The theoretical rate of power change for the sensor's seismic mass is calculated as follows:

$$\frac{dP}{dt} = m[v(t)*j(t) + a(t)^2]$$

where P is power, t is time, m is the mass of the sensor's seismic mass, v(t) is velocity with respect to time, j(t) is jerk with respect to time, and a(t) is acceleration with respect to time. The preferred embodiment of the instant method assumes a unit mass and then calculates a value which approximates the rate of power change for the sensor's seismic mass according to the following formula:

$$\frac{dP}{dt} \approx V*J + A3^2$$

Thus, under the instant method, the velocity-jerk product, V*J, is added to the squared acceleration value $A3^2$ to obtain a value proportional to the rate of change of power for the sensor's seismic mass. Thus, the algorithm employed by the preferred embodiment of the instant invention takes into account both terms in the rate of power equation, including the velocity-jerk product and the squared acceleration value, to avoid the above-described problems inherent to prior art methods.

The above-determined value for the rate of change of power, dP/dt, has been found to be a superior criterion for discriminating between conditions requiring actuation of the vehicle safety device and conditions where such actuation is either unnecessary or undesirable. Thus, in accordance with the instant invention, the value for the rate of change of power is compared with a threshold T therefor, with actuation of the safety device being indicated when the rate of power change value exceeds this threshold. As noted hereinabove, a time-varying threshold T(t), an example of which is illustrated in FIG. 4, may be employed with the instant method to tailor safety device response to each vehicle, thereby providing vehicle passengers maximum protection against injury.

One of the problem areas for crash algorithms is the processing of rough road data or electromagnetic (EMI) noise data. The standard integration method usually has no difficulty with this data, due to the nearly zero overall velocity. However, in an algorithm that uses slope, or jerk, the values of slope and peak acceleration can be extremely high. The instant invention overcomes this problem by multiplying the jerk J by the velocity V to obtain the velocity-jerk product, V*J.

Figure 3A:
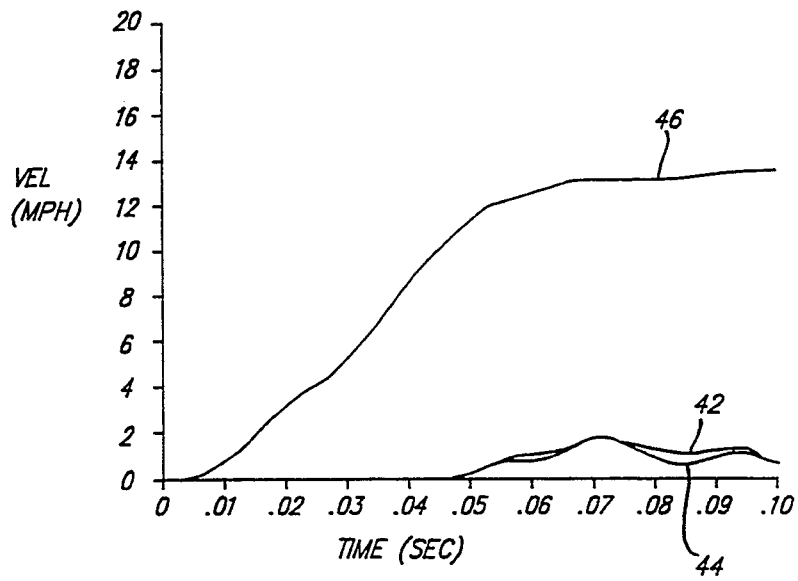
FIGS. 3A through 3C present waveforms which illustrate the effectiveness of the instant method in detecting conditions requiring actuation of a vehicle safety restraint.
Figure 3B:
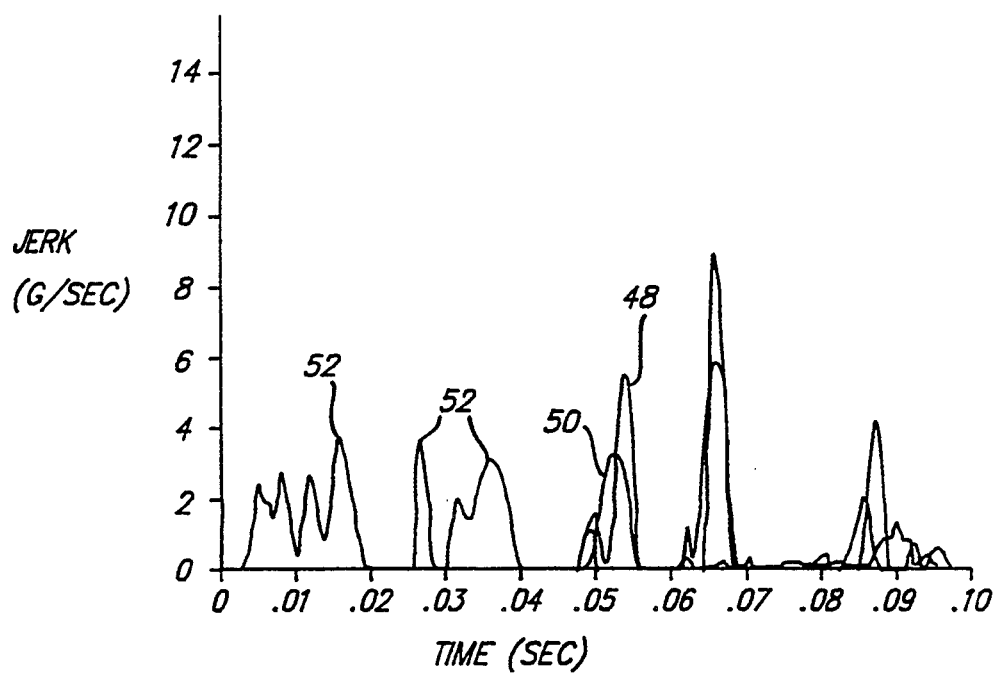
Figure 3C:
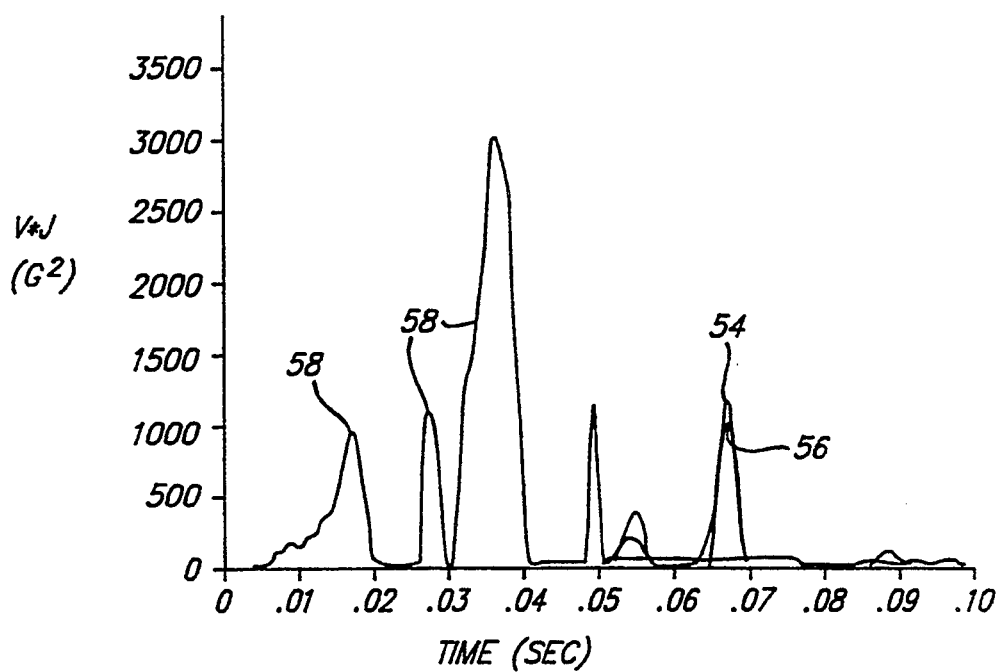

The effectiveness of multiplying the jerk J by the velocity V is illustrated by the waveforms shown in FIGS. 3A through 3C. Specifically, the waveforms in FIG. 3A illustrate the integrated velocity of two noise channels 42 and 44, along with a 10 mph fire channel 46 to show relative levels. The average slope, or jerk, of these channels 42, 44, and 46, are plotted in FIG. 3B, where plots 48, 50, and 52 correspond to channels 42, 44, and 46 of FIG. 3A, respectively. The peak jerk values of the noise data, plots 48 and 50, are more than twice that of the 10 mph data of plot 52. Consequently, if only the jerk term is used for crash discrimination, the accompanying noise data would likely cause unnecessary, inadvertent, and perhaps wholly undesirable deployment of vehicle safety devices.

As noted above, the instant invention solves this problem by multiplying the velocity V by the jerk J, producing a velocity-jerk product, V*J, as illustrated by plots 54, 56, and 58 in FIG. 3C. When the velocity (plots 42, 44, and 46 of FIG. 3A) and jerk (plots 48, 50, and 52 of FIG. 3B) are multiplied together, the peak of the resulting velocity-jerk product for the 10 mph channel, plot 58, significantly exceeds the velocity-jerk products of the noise data, plots 54 and 56. Hence, under the instant invention, a vehicle safety device will not be deployed unnecessarily or inadvertently by road noise. Similar results are found with respect to EMI.

Finally, it is believed that the instant method is able to discriminate between "fire" and "no fire" conditions in less time than with known crash discrimination methods. Specifically, as noted hereinabove, the basis of the instant method is the multiplication of the velocity by the slope of acceleration, or jerk. The use of jerk allows for prediction of crash severity. The rate of change of power, or the first derivative of power, involves adding the physical quantity of velocity-jerk product to the squared acceleration value. Consequently, by using the velocity-jerk product to obtain a value for the rate of change of power, the equivalent velocity of a crash pulse can be determined more quickly than with prior systems or methods.

While the preferred embodiment of the invention has been disclosed, it should be appreciated that the invention is susceptible of modification without departing from the spirit of the invention or the scope of the subjoined claims.

We claim:

1. A system for actuating a safety device on a vehicle, said system comprising:

means for generating sampled data representative of the instantaneous acceleration of said vehicle;

a RAM for storing consecutive values of said acceleration data;

means for integrating said acceleration data to determine a vehicle velocity value;

means for determining a jerk value based on said acceleration data;

means for calculating a value for the rate of change of power of said vehicle based on said vehicle velocity value and said jerk value; and means responsive to said rate of change of power value for actuating said safety device when said rate of change of power value exceeds a threshold value therefor.

2. The system of claim 1 wherein said threshold value for said rate of change of power value varies over time.

3. A system for actuating a safety device on a vehicle, said system comprising:

means for generating sampled data representative of the instantaneous acceleration of said vehicle;

a RAM for storing consecutive values of said acceleration data;

means for integrating said acceleration data to obtain a vehicle velocity value;

means for squaring said acceleration data to obtain a squared acceleration value;

means for determining a jerk value based on said acceleration data;

means for multiplying said vehicle velocity value and said jerk value to obtain a velocity-jerk product;

means for adding said velocity-jerk product and said squared acceleration value to obtain a rate of change of power value; and means responsive to said rate of change of power value for actuating said safety device when said rate of change of power value exceeds a predetermined threshold value.

4. The system of claim 3 wherein said means for generating sampled data includes an acceleration sensor providing an analog output representative of vehicle acceleration; an anti-aliasing filter for filtering said analog output; and an analog-to-digital converter for sampling said filtered analog output.

5. The system of claim 3 including means for generating at least two acceleration values based on said stored acceleration data, said acceleration values being totals or averages of said stored acceleration data.

6. The system of claim 3 wherein said threshold value for said rate of change of power value varies over time.

7. The system of claim 2 or 6, wherein said threshold value initially decreases with time from an initial value to a intermediate value and then increases from said intermediate value to a final value, said final value being less than said initial value.

8. The system of claim 7, including means for comparing said jerk value and said acceleration data with a second and third threshold, respectively, and wherein said threshold value for said rate of change of power value is reset to said initial value when said jerk value and said acceleration data fall below said second and third threshold values, respectively.

9. A system for actuating a safety device on a vehicle, said system comprising:

sensor means for generating an analog output representative of the instantaneous acceleration of said vehicle;

an anti-aliasing filter for filtering said sensor output;

an analog-to-digital converter for sampling said sensor output to obtain acceleration data;

a RAM for storing consecutive values of said acceleration data;

means for obtaining at least two acceleration values based on said stored acceleration data;

an accumulator for integrating said acceleration data to determine a vehicle velocity value;

a first multiplier for squaring one of said acceleration values to obtain a squared acceleration value;

means for determining a jerk value based on two of said acceleration values, said means for determining a jerk value including an inverter for changing the sign of one of said two acceleration values to obtain a negative acceleration value, and an adder for adding said other of said two acceleration values and said inverted acceleration value to obtain said jerk value;

a second multiplier for multiplying said vehicle velocity value and said jerk value to obtain a velocity-jerk product;

a fourth adder for adding said velocity-jerk product and said squared acceleration value to obtain a rate of change of power value; and means responsive to said rate of change of power value for actuating said safety device when said rate of change of power value exceeds a threshold value therefor.

10. The system of claim 9 wherein said means for obtaining at least two acceleration values based on said acceleration data includes a first adder for determining the first of said acceleration values, and a second adder for determining the second of said acceleration values; and including a means for scaling said squared acceleration value with respect to said velocity-jerk product.

11. A method for actuating a vehicle safety device, said method comprising the steps of:

sampling data representative of instantaneous vehicle acceleration;

storing consecutive values of said acceleration data in a buffer;

integrating said data to determine a vehicle velocity value;

calculating a jerk value based on said stored acceleration data;

calculating a value for the rate of change of power of said vehicle due to said acceleration based on said vehicle velocity value and said jerk value; and actuating said safety device if said value for the rate of change of power exceeds a threshold value.

12. The method of claim 11 including the step of varying said threshold value for said rate of change of power value over time.

13. A method for actuating a vehicle safety device, said method comprising the steps of:

sampling data representative of instantaneous vehicle acceleration;

storing consecutive values of said acceleration data in a buffer;

integrating said acceleration data to obtain a vehicle velocity value;

squaring said acceleration data to obtain a squared acceleration value;

calculating a jerk value based on said stored acceleration data;

multiplying said vehicle velocity value and said jerk value to obtain a velocity-jerk product;

adding said velocity-jerk product and said squared acceleration value to obtain a rate of change of power value; and actuating said safety device if said rate of change of power value exceeds a predetermined threshold value.

14. The method of claim 13 including the step of varying said threshold value for said rate of change of power value over time.

15. The method of claim 12 or 14, wherein said threshold value initially decreases with time from an initial value to a intermediate value and then increases from said intermediate value to a final value, said final value being less than said initial value.

16. The method of claim 15, including the steps of comparing said jerk value and said acceleration data with a second and third threshold, respectively; and resetting said threshold value for said rate of change of power value to said initial value when said jerk value and said acceleration data fall below said second and third threshold values, respectively.

* * * * *